Jan. 16, 1962  H. F. WINDSOR  3,017,288
METHOD FOR FILMING PHOSPHOR SCREENS
Filed Oct. 20, 1955
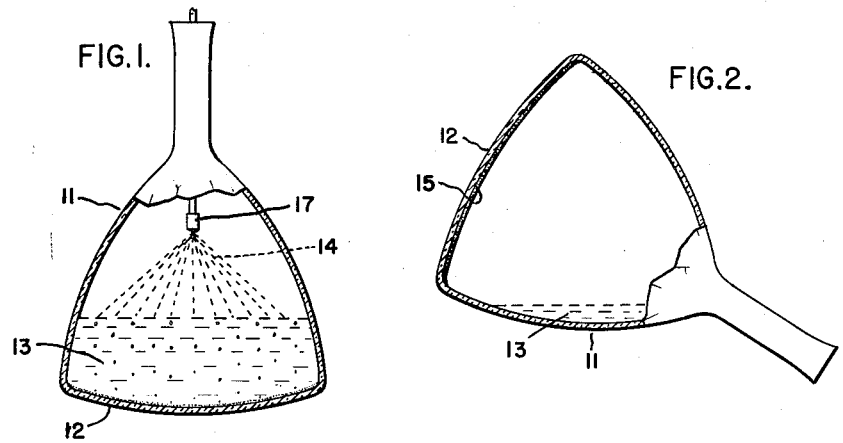
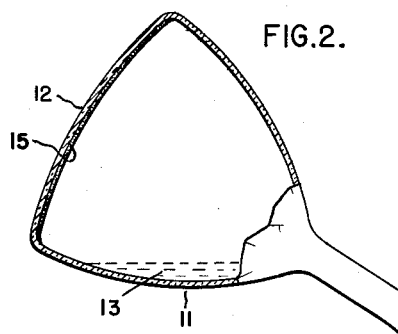
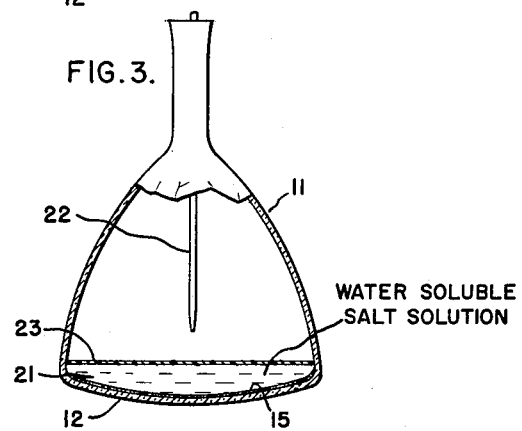
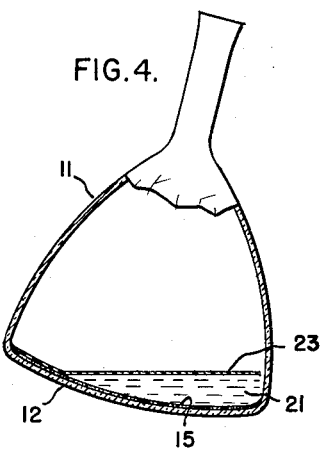
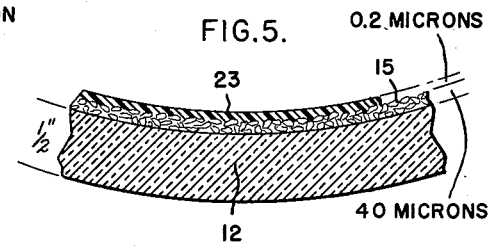
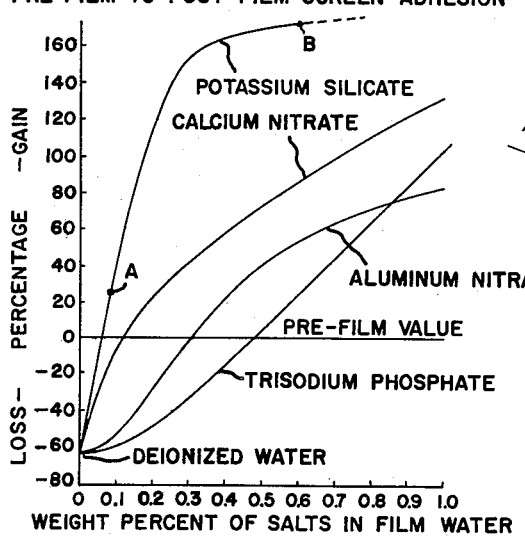
INVENTOR:
HAROLD F. WINDSOR,
BY
HIS ATTORNEY.

3,017,288
METHOD FOR FILMING PHOSPHOR SCREENS
Harold F. Windsor, Syracuse, N.Y., assignor to General
Electric Company, a corporation of New York
Filed Oct. 20, 1955, Ser. No. 541,611
3 Claims. (Cl. 117—33.5)

This invention relates to cathode ray tubes and more particularly to a novel method for producing luminescent screens including coating of phosphor screens of such cathode ray tubes.

It has been found advantageous for various reasons, such as increased brightness and absence of ion burn, to apply a metal coating to the phosphor screen surface of cathode ray tubes. The metal coating should be a thin, smooth, and continuous layer in close contact with the phosphor screen. Since dry phosphor leaves a rough surface having a multitude of crevices and peaks, deposition of the thin metallic layer directly on the phosphor screen will cause the crevices to be filled with metallic particles while leaving uncoated the projecting peaks, thus forming a discontinuous and light scattering surface. Therefore, it is conventional practice to form a temporary intermediate layer consisting of a thin, volatilizable, organic film over the phosphor screen to provide a smooth base on which the metal coating can be deposited. After the metal coating is deposited the temporary film is volatilized and removed.

In accordance with one general type of process for applying the above-mentioned intermediate film layer, the phosphors are initially settled onto the tube face panel through a large volume of barium-silicate solution. The barium-silicate solution is next removed and the phosphor is dried. A deionized water cushion, e.g., a cushion of purified water from which gels, sulphates, precipitates, etc., have been extracted, is then introduced to cover the phosphor surface. Filming material is next deposited on the water cushion and spreads over the entire surface of said cushion. The water cushion is then decanted, bringing the film material into contact with the phosphor surface.

A disadvantage of this prior art process resides in the fact that the deionized water cushion deteriorates the adhesive properties of the phosphor surface; adherence of the phosphor particles to each other, to the film material, and to the glass face panel decreases markedly. As a result, the phosphor surface will tend to separate, chip, or peel, thus necessitating that subsequent special operations be performed, as for example, the addition of a large amount of plasticizer to reduce the film tension so as to prevent the film, as it dries and contracts, from pulling on the phosphor surface and tending to cause the phosphor particles to separate from each other and from the glass face panel. However, the addition of a large amount of plasticizer has the detrimental effect that it results in a sinuous film which causes a decrease in tube brightness because of the light scattering effect. A second disadvantage of this prior art method is that subsequent factory processing must also be slowly and delicately performed, to avoid adversely affecting the phosphor screen.

It is, therefore, a principal object of this invention generally to improve the method of forming luminescent screens for cathode ray tubes.

Another object of the present invention is to provide a novel method for filming phosphor screens of cathode ray tubes which includes the step of adding cushion solution which increases the adhesion among the phosphor particles, between the phosphor screen and the face panel of the cathode ray tube, and between the phosphor particles and the organic film.

It is yet another object of the present invention to provide a novel method for forming a screen surface which has good brightness characteristics.

It is another object of the present invention to provide a novel method for forming mottle-free screens in cathode ray tubes.

In the attainment of the foregoing objects of my invention, I provide a novel method for forming a thin volatilizable, organic film over a phosphor surface which includes the introduction of a cushion solution containing concentrations of water soluble salts which will enhance the adhesive properties of the phosphor screen.

Other objects and advantages will be apparent after a consideration of the specification and drawings in which:

FIGURE 1 is an elevation view, partly in cross section, of a cathode ray tube showing a phosphor slurry being introduced into a settling solution;

FIGURE 2 is a similar view, showing the tube tilted to pour off the settling solution;

FIGURE 3 is a similar view, showing a water soluble salt solution covering the now dried phosphor screen and indicating the introduction of a filming material on the surface of the salt solution;

FIGURE 4 is a similar view, showing the water soluble salt solution being decanted to bring the film surface into contact with the phosphor screen;

FIGURE 5 is an enlarged fragmentary cross sectional view showing the film resting on the phosphor screen on the face panel of the cathode ray tube; and FIGURE 6 is a graph showing the results obtained using various water soluble salt solutions.

For an example, I shall hereinbelow describe my invention in relation to the filming of 21" cathode ray tubes, the suggested amounts and concentrations being suitable for screens of such size. Essentially two separate operations are performed, the screening operation during which the phosphor screen is settled on the tube face panel, and the filming operation, during which the temporary intermediate film is deposited on the phosphor screen. FIGURE 1 shows a vertically disposed glass cathode ray tube envelope 11 into which there has been introduced approximately 15,000 cc. of dilute barium acetate solution 13 which functions as a screening or settling solution covering the substantially horizontal face panel 12. When the solution 13 has become motionless a phosphor slurry 14 made up of about 8 grams of powdered phosphor, 500 cc. of potassium silicate solution, and 1000 cc. of water is sprayed from a conventional nozzle 17 to uniformly cover the surface of solution 13. The face of the tube is then heated by the application of radiant heat for about 20 minutes to expedite the settling of the phosphor in the slurry 14 through the solution 13. After the phosphor settles to form the screen surface 15, the solution 13 is poured out by tilting the tube envelope 11, FIGURE 2. The phosphor is then dried leaving a rough surface 15, shown in FIGURE 5. The process of settling the phosphor screen, per se, forms no part of my invention and is more completely described and claimed in U.S. 2,662,829, granted December 15, 1953, to P. W. Krause and assigned to the assignee of this application.

Next, the tube may be returned to a vertical position, FIGURE 3, and, in accordance with this invention, a liquid cushion solution 21 including water soluble salts is poured into the tube envelope 11 to cover the phosphor surface 15. A water soluble salt which I have found to be quite suitable is silicate. Potassium silicate with an average mole ratio of $K_2O$ to $SiO_2$ of 1 to 3.45 has been successfully employed in commercial factory processes. Potassium silicate within the ranges of from about 0.05% to about 0.60% by weight in the film water is satisfactory, with the optimum percentage for overall efficiency being approximately 0.1%.

The screening solution used in the above-described first operation may be diluted to the optimum silicate range with deionized water and used in lieu of a newly prepared silicate solution. The addition of too much silicate results in the phosphor being covered with too thick a coating and tends to result in a less bright tube, while the addition of too small an amount of silicate has little appreciable effect on the dry screen adhesion.

After the silicate solution 21 has become motionless a droplet of volatile organic film lacquer comprising nitrocellulose and a plasticizer in a suitable solvent, as for example, amyl acetate, is deposited on the surface 21 from a conventional dispensing device 22 and allowed to spread until it completely covers the surface of the silicate solution 21 with a thin film 23. Next, the tube is tilted to pour out the silicate solution 21 and to bring the layer of film material 23 into contact with the phosphor screen 15, FIGURE 4. The tube is tilted slowly to permit the film 23 to adhere smoothly and evenly to the phosphor screen 15. This decanting operation is continued until all of the silicate solution 21 is removed and the film covers the entire phosphor screen. A partial cross section of the face of the cathode ray tube is shown in FIGURE 5. Approximately, face panel 12 is ½" thick, phosphor screen 15 is 40 microns thick and film 23 is 0.2 micron thick. After the film 23 dries, a metallic coating (not shown) is applied on the smooth film surface. Such metallic coating may be evaporated, brushed or otherwise applied, as is well known, for minimizing loss of light, as noted above.

Subsequently, the volatile film 23 is removed by the usual baking operation which consists in heating the tube face to an elevated temperature, with or without an air flush. The metallic coating will then rest on the peaks of the phosphor surface in a smooth configuration.

Although various water soluble salts can be used in the cushion solution 21, the use of a silicate is preferred. Numerous water soluble salts have been successfully employed; a representative sampling is shown in the graph of FIGURE 6 in which the abscissas represent percentage by weight of salt in water and the ordinates represent percentage loss or gain of screen adhesion. Curves representing the effect found with potassium silicate, calcium nitrate, aluminum nitrate and trisodium phosphate are shown in FIGURE 6. As will be seen, certain of the salts will produce the same effect as silicates, although a much greater concentration of these other salts must be used, as will be explained in detail hereinbelow.

The graph of FIGURE 6 shows the percentage gain or loss from pre-film to post-film screen adhesion for various salts. The following formula was employed for determining percentage gain or loss:

Percentage gain or loss
$$= \frac{\text{Post-film adhesion} - \text{pre-film adhesion}}{\text{Pre-film adhesion}} \times 100$$

The pre-film adhesion value of the phosphor screen to a glass surface is taken as the basic reference point and designated as zero percent. For example, when using 0.08 percent by weight of silicate in the film water the pre-film adhesion was measured as 40 p.s.i. and the post-film adhesion was measured as 50 p.s.i.; substituting these values in the formula it is calculated that the percent gain of adhesion is 25 percent, point "A" on the graph. The pounds per square inch values can be obtained by using a screen air blow-off test to determine the dry adhesion of the screen to the glass surface. A suitable test set-up includes a precision orifice placed at a fixed predetermined distance from, and at an angle of 45° with the phosphor screen which is coated on a glass surface. A jet of air is blown from the orifice onto the phosphor screen and the adhesion value is the measure of the minimum force necessary to blow a hole in the phosphor screen.

The pre-film adhesion test is made after the phosphor screen has been settled and dried on the glass. To continue the test the same phosphor screened glass is next placed in a solution for a period of time and at the same temperature equivalent to that normally required for filming the phosphor screen of a cathode ray tube with a volatilizable film. The phosphor screened glass is then withdrawn, and dried under the same conditions as used in drying the film in cathode ray tubes, the air blow-off test is repeated and the force required to blow the phosphor off of the glass surface is measured; this is the post-film adhesion value.

The post-film values obtained correspond to the values which would be obtained after the filming operation in the process in which a liquid cushion is placed over a phosphor surface and the film is settled onto the phosphor screen by decanting the water. It has been found that if a phosphor screen glass surface has been immersed in a deionized water the post-film adhesion value is much less than the pre-film adhesion value. In contrast, the addition of a water soluble salt to the deionized water resulted in a post-film adhesion value which was even higher than the pre-film adhesion value.

As can be seen clearly from the graph, silicate obtains higher adhesion properties from a smaller percentage by weight of silicate in the film water than the other materials tested. By the addition of 0.6 percent by weight of silicate in the film water the original pre-film adhesion value was increased up to 170%, point "B" on the graph.

Other water soluble salts have been found suitable and representative results obtained from using calcium nitrate, aluminum nitrate, and trisodium phosphate are shown. However, relatively larger amounts of these salts are required to obtain commercially satisfactory results, and also, the pre-film adhesion strength can be increased less than is the case with silicate.

While the exact details of the reactions involved are not thoroughly understood, it is believed that the salts in the solution prevent the redissolving or disassociation of the screen binder. By concentration control of the water soluble materials the initial binder strength can be retained and even increased. I have found that due to the "resoaking" of the dried phosphor surface with conventional deionized cushion water commonly employed heretofore, 50% to 70% of the screen dry adhesion is lost, FIGURE 6. The required factory processing which includes the volatilizing process by which the intermediate film is separated from the phosphor and metallic surfaces, and the exhaust process by which volatile materials are removed from the envelope further reduces the screen adhesion an additional amount. This means that after the factory processing is completed, the screen has only a few percent of the pre-film adhesion value. By far, the greatest loss occurred during the filming operation, i.e., when the phosphor screen is in contact with the deionized water solution. By introducing water soluble salts into the film water in accordance with this invention, not only can the pre-film adhesion value be retained, but the adhesion properties of the phosphor can actually be increased from 0% to approximately 170%. The phosphor screen now only needs sufficient dry adhesion to withstand the entrance of the film cushion water, and by introducing water soluble salts and preferably silicates into the film water any degree of adhesion can be built into the surface.

The addition of the silicate, apparently prevents the resolubilizing of the silica gel matrix, or binder, by the film cushion water. The silica gel matrix or binder with its inherent bonding characteristics, is prevented from redissolving in the film cushion solution because of the relatively high silicate concentration already in the liquid solution.

Another advantage of my invention is that I have been able to produce mottle-free screens. When the screen is re-wetted during the heretofore known filming operation the soluble phosphor surface gel matrix is in the greatest concentrations adjacent to the surface. These soluble materials are trapped between the wet surface and the wet film during the film operation. As the film dries, the area that dries first, draws more liquid from the wet areas, and the soluble materials are dried in ring, or mottled, pattern. A similar ring pattern can be obtained by drying dilute silicate drops on the plate of glass. However, by adding silicates to the film water, as hereinabove described, the phosphor screen silicate gel matrix is retained in position and the liquid is not drawn to the drier areas. The amount of silicate utilized in the film water apparently either dries as a non-visible solid or is not in concentrations great enough to cause mottling.

Still another advantage of my invention is that I have been able to produce tubes that have phosphor screens which are characterized by increased brightness.

By the prior art filming process using deionized water, subsequent factory processes were gauged on the resulting adhesion that remained after soaking the phosphor surface in the deionized film water. Of particular note, was the amount of plasticizers needed to reduce film tension. Without sufficient plasticizers the nitrocellulose film as it dried and contracted, would pull off the phosphor particles from each other and from the dome-shaped face panel of the picture tube. Thus, the needed plasticizer concentration was determined by the post-film dry phosphor surface strength. As stated previously, the addition of a large amount of plasticizers results in a sinuous film which causes a decrease in tube brightness. By increasing the dry phosphor surface strength, I have been able to reduce the plasticizer concentration and to increase the film tension, resulting in a substantial increase in tube brightness due to the fact that the metal backing is now coated on a smooth, straight surface.

Although a flotation process is described herein any other type of film application may be employed, such as spraying, sloshing, or swirling. The invention is applicable in any process wherein a film must be laid over a phosphor screen surface which has previously been dried and must be re-wetted in order to present the proper adhesive properties to said film.

While specific examples have been given in describing details of this invention, it will be understood that they have been given merely by way of illustration and that the invention is not limited thereto.

What I claim as new and desire to secure by Letters Patent of the United States is:

1. In a method of making a luminescent screen for a cathode ray tube or the like which includes the steps of covering a substrate with a layer of cushioning liquid containing particles of luminescent material and a water soluble binder for securing said particles together, allowing the luminescent material and binder to settle through the cushioning liquid onto the substrate in a layer of desired thickness, removing the cushioning liquid, and drying the layer of settled material in place on the substrate, re-covering the layer of settled material with an aqueous solution, introducing a charge of organic film forming material onto the surface of said aqueous solution, and removing said solution from beneath said film forming material to bring the film forming material into contact with the layer of luminescent material, the improvement in which the aqueous solution applied to the dried layer of luminescent material contains an alkali metal silicate in a concentration of 0.05 to 0.6 percent by weight.

2. In a method of making a luminescent screen for a cathode ray tube or the like which includes the steps of covering a substrate with a layer of cushioning liquid containing particles of luminescent material and a water soluble binder for securing said particles together, allowing the luminescent material and binder to settle through the cushioning liquid onto the substrate in a layer of desired thickness, removing the cushioning liquid, and drying the layer of settled material in place on the substrate, re-covering the layer of settled material with an aqueous solution, introducing a charge of organic film forming material onto the surface of said aqueous solution, and removing said solution from beneath said film forming material to bring the film forming material into contact with the layer of luminescent material, the improvement in which the aqueous solution applied to the dried layer of luminescent material contains a salt from the group consisting of calcium nitrate, aluminum nitrate, and trisodium phosphate, said salt having a concentration of about .05 to 1.0 percent by weight.

3. In a method of making a luminescent screen for a cathode ray tube or the like which includes the steps of covering a substrate with a layer of cushioning liquid containing particles of luminescent material and a water soluble binder for securing said particles together, allowing the luminescent material and binder to settle through the cushioning liquid onto the substrate in a layer of desired thickness, removing the cushioning liquid, and drying the layer of settled material in place on the substrate, re-covering the layer of settled material with an aqueous solution, introducing a charge of organic film forming material onto the surface of said aqueous solution, and removing said solution from beneath said film forming material to bring the film forming material into contact with the layer of luminescent material, the improvement in which the aqueous solution applied to the dried layer of luminescent material contains potassium silicate in a concentration of 0.05 to 0.6 percent by weight.

References Cited in the file of this patent

UNITED STATES PATENTS

| | | |
|---|---|---|
| 2,423,626 | Szegho | July 8, 1947 |
| 2,650,884 | Pakswer et al. | Sept. 1, 1953 |
| 2,662,830 | Darlaston | Dec. 15, 1953 |
| 2,710,262 | Larach | June 7, 1955 |
| 2,763,567 | Nagy | Sept. 18, 1956 |